Figure 1:
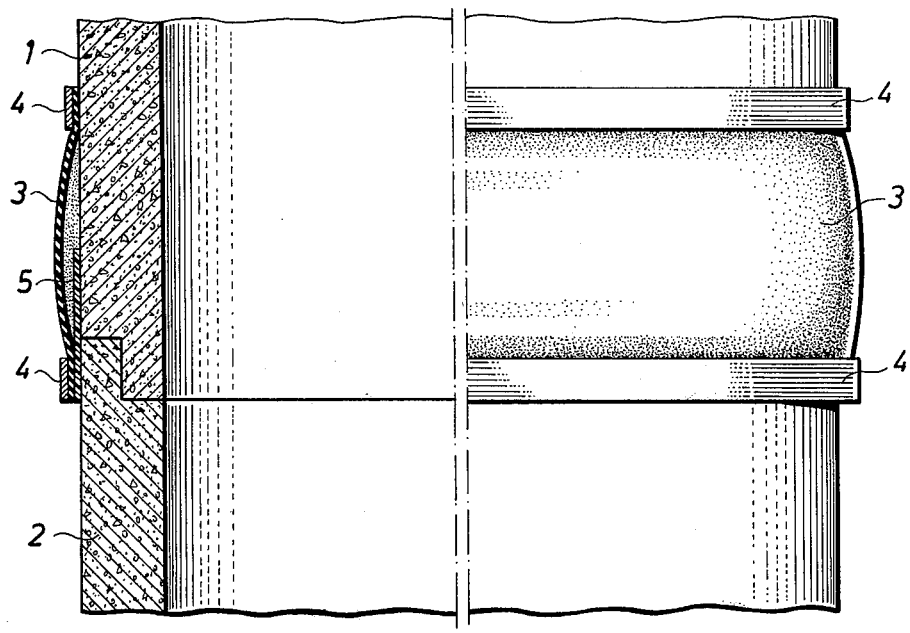

United States Patent [19]

Arntyr et al.

[11] 4,325,572

[45] Apr. 20, 1982

[54] ARRANGEMENT IN RAIN-WATER DRAINS OR MANHOLES

[76] Inventors: Oscar S. Arntyr, Wallingatan 37, S-111 24 Stockholm; Thord I. Engström, S-950 18 Bensbyn, both of Sweden

[21] Appl. No.: 149,880

[22] Filed: May 14, 1980

[30] Foreign Application Priority Data

Nov. 8, 1979 [SE] Sweden ............................ 7904515

[51] Int. Cl.³ ............................................ F16L 27/10
[52] U.S. Cl. ................................... 285/229; 285/236; 285/423
[58] Field of Search ............... 285/229, 236, 230, 231, 285/235, 300, 423

[56] References Cited

U.S. PATENT DOCUMENTS

| | | | |
|---|---|---|---|
| 3,070,130 | 12/1962 | Risley | 285/300 |
| 3,212,798 | 10/1965 | Lewis et al. | 285/230 |
| 3,837,683 | 9/1974 | Taylor | 285/236 |
| 3,866,925 | 2/1975 | Maimstrom | 285/230 X |
| 4,076,283 | 2/1978 | Harrison | 285/230 |
| 4,116,474 | 9/1978 | Wolf | 285/230 X |

FOREIGN PATENT DOCUMENTS

| | | | |
|---|---|---|---|
| 387193 | 12/1923 | Fed. Rep. of Germany | 285/236 |
| 971124 | 9/1964 | United Kingdom | 285/235 |
| 1246055 | 9/1971 | United Kingdom | 285/235 |

*Primary Examiner*—Dave W. Arola
*Attorney, Agent, or Firm*—Sughrue, Mion, Zinn, Macpeak and Seas

[57] ABSTRACT

An arrangement in vertical tubular structures, such as rain-water drains and manholes, comprising a plurality of pipe sections placed one upon the other, for preventing the surrounding filling mass from penetrating the joints if the pipe sections move relative to one another. The arrangement comprises a sealing cuff arranged to be placed around the tubular structure in a manner such as to cover the joint between two mutually adjacent pipe sections, and to be pressed sealingly against the outer cylindrical surface of the two pipe sections. The sealing cuff is such as to permit a limited relative movement axially between the pipe sections. Suitably, a protective sleeve made of a rigid material is arranged around the pipe sections beneath the sealing cuff.

4 Claims, 3 Drawing Figures

ARRANGEMENT IN RAIN-WATER DRAINS OR MANHOLES

The present invention relates to an arrangement in vertically extending tubular structures, such as rain-water drains, manholes and like structures comprising a plurality of pipe sections mounted one upon the other. So that the pipe sections can be guided when mounting said sections one upon the other, and so that the joints can be sealed against a surrounding filling mass, the pipe sections are normally constructed to form so-called stepped joints or muff joints.

With vertically extending tubular structures of the aforedescribed kind, the uppermost pipe section in particular is liable to be lifted in the event of heavy ground frosts, by the freezing of the earth in the upper earth layer. This lifting movement can be of such magnitude as to enable the surrounding filling mass to penetrate into the joint of the nearest underlying pipe section, thereby preventing the return of the uppermost pipe section to its initial position when the ground thaws. Eventhough the aforesaid lifting movement may not be sufficiently great to fully open the joint, it is possible that a certain amount of filling mass may penetrate the joint over consecutive seasons, resulting in a fully open joint after some years.

Attempts have been made to overcome this problem, inter alia, by providing the pipe sections with longer muffs. The provision of longer muffs, however, has not solved the problem, but merely extended the length of time before the joint is fully opened. In many cases, however, the progressive lifting of the cover plate of such tubular structures, e.g. rain-water drains and manholes, cannot be tolerated, since it is necessary that said covers lie at the same level as the surrounding ground surface.

The main object of the present invention is to provide an arrangement in rain-water drains and manholes of the aforementioned kind, which enables pipe sections which have been raised by forces created in the ground as it freezes during heavy frosts to return to their original position when the ground thaws.

This object is achieved in accordance with the invention by placing around the tubular structure, i.e. the rain-water drain or manhole, a sealing cuff in a manner such as to seal the joint between two mutually adjacent pipe sections. The sealing cuff is pressed sealingly against the outer cylindrical surface of the two pipe sections and is so constructed or arranged that it permits a limited relative axial movement between said sections.

In a preferred embodiment, the sealing cuff is of annular configuration and made of a resilient material, suitably butyl rubber.

In order to prevent the sealing cuff being pressed into the joint between said pipe sections, part of the sealing cuff adjacent its one edge may be stiffer than the remainder of the cuff. Alternatively, a rigid protective sleeve can be arranged over the joint, between the sealing cuff and the outer cylindrical surfaces of the pipe sections. The protective sleeve is then suitably braced around one pipe section.

In an alternative embodiment, which does not require the sealing cuff to be made of a resilient material, there is arranged around at least one pipe section a rigid sleeve, and the sealing cuff is braced in a manner such that it forms a fold between the outer cylindrical surface of the tube section and the sleeve. This embodiment is particularly suitable for use with muff joints, the sleeve preferably having a substantially triangular cross-sectional shape.

Figure 2:
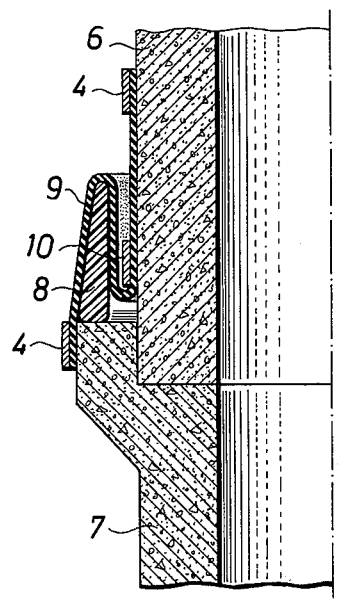
Figure 3:
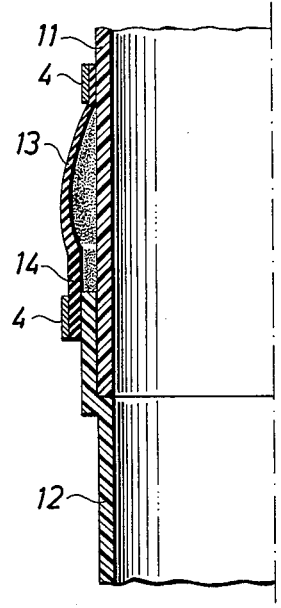

Exemplary embodiments of the invention will now be described with reference to the accompanying drawings, in which FIG. 1 is a part sectional view of a stepped joint between two concrete pipes, said joint being sealed by means of an arrangement according to the invention, and FIGS. 2 and 3 illustrate alternative embodiments of an arrangement according to the invention applied to muff joints.

In FIG. 1 the references 1 and 2 identify two pipe sections placed one upon the other and forming part of a vertically extending tubular structure, such as a rain-water drain or a manhole.

The pipe sections are joined together by means of a so-called stepped joint, which guides the sections relative to one another and prevents surrounding filling mass from penetrating the joint and entering the tubular structure.

For the purpose of sealing the joint should the pipe sections 1 and 2 move axially relative to one another as a result of the surrounding ground freezing, for example, an annular, resilient sealing cuff 3 is arranged around said pipe sections so as to cover the joint therebetween. The sealing cuff is pressed sealingly against the cylindrical surface of respective pipe sections by means of a steel band 4. To prevent the sealing cuff being pressed into the joint between the pipe sections 1 and 2 by the pressure exerted by the surrounding filling mass, when said pipe sections move relative to one another, a rigid sleeve 5 is placed over an external interface zone of the joint between the outer cylindrical surfaces of the pipe sections and the cuff 3. In the illustrated embodiment, the sleeve 5 is braced about the pipe section 2 by means of the lower steel band 4.

FIG. 2 illustrates schematically a joint between two concrete pipes 6 and 7, the lower pipe being provided with a muff for receiving the lower end of the upper pipe 6. In this embodiment, a rigid sleeve 8 is arranged on the muff, and the sealing cuff 9, which in accordance with FIG. 1 is braced at the upper and lower pipe respectively by means of steel bands 4, forms a fold between the sleeve 8 and the outer cylindrical surface of the pipe 6. In the illustrated embodiment, this is achieved by bracing the cuff 9 about the upper pipe by means of a further steel band 10.

In the embodiment illustrated in FIG. 2, the sealing cuff 9 need not be made of a resilient material, since the fold represents an extra length of sealing cuff, which permits certain axial displacement between the pipe sections 6 and 7.

In FIG. 3 there is illustrated a joint protector in accordance with the invention, which is particularly suitable for use when the pressure from the surrounding filling mass is not excessively great. In this Figure, the references 11 and 12 identify two pipes of plastics material, and the joint protector comprises a resilient sealing cuff 13 which, as with the previous embodiments, is sealingly mounted to respective pipe sections by means of steel bands 4. To prevent the joint protector from being pressed into the joint between respective pipe sections, the sealing cuff 13 has a lower portion 14 which is more rigid than the remainder of the cuff. This can be achieved, for example, when using a plastics material or a rubber material, by the use of suitable additives.

The sealing cuffs 3 and 13 are suitably made of butyl rubber, while the protective sleeves 5 and 8 may, for example, be made of polypropylene resin. The use of resilient sealing cuffs provides the advantage whereby said cuffs exert a force which attempts to return the pipe sections to their starting position subsequent to the aforementioned axial displacement.

The invention is not limited to the aforedescribed embodiments, but can be modified in several ways. A common feature of all embodiments, however, is that a sealing cuff is mounted over joints between adjacent pipe sections and arranged to permit axial movements therebetween. When there is a risk of greater movement, measures should be taken to prevent the sealing cuff from being pressed into the joint.

What is claimed is:

1. A pipe joint seal, comprising:
   (a) two vertically oriented pipe sections disposed one atop the other in axial alignment to define an annular joint therebetween and adapted to be installed in an in-ground environment wherein the external pressure surrounding the pipe sections exceeds the internal pressure within the sections,
   (b) the joint including a stepped annular recess in one of the pipe section ends slidingly accommodating a mating end portion of the other pipe section to enable a limited degree of axial movement between the two sections,
   (c) an annular sealing cuff surrounding the joint and overlying an external interface zone thereof whereat the two pipe sections meet,
   (d) means individually clamping an upper edge of the sealing cuff to the outer periphery of an upper one of said pipe sections and a lower edge thereof to the outer periphery of a lower one of said sections, and
   (e) a rigid tubular sleeve surrounding said external interface zone for preventing said sealing cuff from being forced into an open gap of said joint by external pressure upon the axial separation of the pipe sections, said rigid tubular sleeve being disposed beneath the sealing cuff, and the sealing cuff being folded in an S configuration forming two folds and trapping said sleeve in one of the folds and the other fold being between the outer cylindrical surface of one of the pipe sections and said sleeve, and said sleeve sealing cuff and pipe sections being so proportioned and arranged that said sleeve is constantly held in abutting engagement with said one of the pipe section ends.

2. A seal according to claim 1, further comprising bracing means for clamping the cuff at a position intermediate its upper and lower edges around the cylindrical surface of one pipe section.

3. A seal according to claim 1, wherein said sleeve has a substantially triangular cross-sectional shape.

4. A pipe joint seal, comprising:
   (a) two vertically oriented pipe sections disposed one atop the other in axial alignment to define an annular joint therebetween and adapted to be installed in an in-ground environment wherein the external pressure surrounding the pipe sections exceeds the internal pressure within the sections,
   (b) the joint including a stepped annular recess in one of the pipe section ends slidingly accommodating a mating end portion of the other pipe section to enable a limited degree of axial movement between the two sections,
   (c) an annular sealing cuff surrounding the joint and overlying an external interface zone thereof whereat the two pipe sections meet,
   (d) means individually clamping an upper edge of the sealing cuff to the outer periphery of an upper one of said pipe sections and a lower edge thereof to the outer periphery of a lower one of said sections, and
   (e) a rigid tubular sleeve surrounding said external interface zone for preventing said sealing cuff from being forced into an open gap of said joint by external pressure upon the axial separation of the pipe sections, said rigid tubular sleeve being embodied in said integral with one edge portion of the sealing cuff, which portion is more rigid than the remainder of the cuff.

* * * * *